United States Patent
Kienzler et al.

(10) Patent No.: US 6,290,204 B1
(45) Date of Patent: Sep. 18, 2001

(54) VALVE INCLUDING A STEP-UP PISTON FOR CONTROLLING FLUIDS

(75) Inventors: DIeter Kienzler, Leonberg; Klaus-Peter Schmoll, Lehrensteinsfeld; Friedrich Boecking, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,118

(22) PCT Filed: Jul. 3, 1998

(86) PCT No.: PCT/DE98/01838

§ 371 Date: Jul. 8, 1999

§ 102(e) Date: Jul. 8, 1999

(87) PCT Pub. No.: WO99/18348

PCT Pub. Date: Apr. 15, 1999

(30) Foreign Application Priority Data

Oct. 2, 1997 (DE) .............................. 197 43 669

(51) Int. Cl.$^7$ ................................................ F02M 51/00
(52) U.S. Cl. .......................... 251/57; 251/129.19; 251/54
(58) Field of Search ................. 251/57, 54, 77, 251/129.06, 129.19; 123/472

(56) References Cited

U.S. PATENT DOCUMENTS

| 4,320,778 | * | 3/1982 | Baumann | 251/57 X |
| 4,762,300 | * | 8/1988 | Inagaki et al. | 251/129.06 |
| 5,186,151 | * | 2/1993 | Schwerdt et al. | 251/129.19 X |
| 6,067,955 | * | 2/1993 | Boecking | 123/299 |
| 6,089,529 | * | 7/2000 | Boecking | 251/57 |
| 6,142,443 | * | 11/2000 | Potschin et al. | 251/57 |
| 6,155,532 | * | 12/2000 | Heinz et al. | 251/57 |

* cited by examiner

*Primary Examiner*—Kevin Shaver
*Assistant Examiner*—Eric Keasel
(74) *Attorney, Agent, or Firm*—Ronald E. Greigg; Edwin E. Greigg

(57) ABSTRACT

A valve for controlling liquids for its actuation is provided with a liquid-filled coupling chamber, which is disposed between a step-up piston, actuatable by a piezoelectric actuator, and a piston that actuates a valve member. To compensate for leakage in the coupling chamber that is at high pressure, a filling valve is provided. The filling valve is disposed between the step-up piston and the piezoelectric actuator. Upon each return stroke of the piezoelectric actuator, the step-up piston follows the piezoelectric actuator with a time lag, so that the filling valve opens briefly and allows filling of the coupling chamber. The valves intended for use in fuel injection systems for internal combustion engines of motor vehicles.

19 Claims, 2 Drawing Sheets

VALVE INCLUDING A STEP-UP PISTON FOR CONTROLLING FLUIDS

PRIOR ART

The invention relates to a valve for controlling liquids. One such valve is known from European Patent Disclosure EP 0 477 400. There, the actuating piston of the valve member is disposed, tightly displaceably, in a smaller-diameter portion of a stepped bore, while conversely a larger-diameter step-up piston, which is moved with the piezoelectric actuator, is disposed in a larger-diameter portion of the stepped bore.

Between the two pistons, a hydraulic chamber is enclosed in such a way that when the step-up piston is moved a certain distance by the actuator, the actuating piston of the valve member is moved by a distance that is increased by the step-up ratio of the stepped bore diameters. The valve member, actuating piston, larger-diameter step-up piston, and piezoelectric actuator are all located on the same axis.

In such valves, the problem exists of compensating for changes in length of the piezoelectric actuator, the valve, or the valve housing, by means of the hydraulic coupling chamber. Since the piezoelectric actuator, for opening the valve, generates a pressure in the coupling chamber, this pressure also leads to a loss of coupling chamber liquid. To prevent the coupling chamber from being pumped dry, it must be refilled. A device that is intended to accomplish such refilling is already known from the prior art named at the outset, but this prior art has the disadvantage that a connection between the coupling chamber and a supply container that is constantly open in both possible flow directions is provided, which significantly affects the operating performance of the piezoelectric actuator. In particular, a thus increased volume leads to a compressibility that reduces the transmission rigidity of the hydraulic column formed by the coupling chamber.

ADVANTAGES OF THE INVENTION

The valve of the invention has an advantage over the prior art that filling of the coupling chamber is attained in a simple way via a valve function, and thus the step-up piston and the piston that actuates the valve always remain at the same spacing from one another. It is also advantageous that filling of the coupling chamber can be attained by simple means.

BRIEF DESCRIPTION OF THE DRAWINGS

One exemplary embodiment of the invention is shown in the drawings and described in further detail below. Shown are.

DESCRIPTION OF THE EXEMPLARY EMBODIMENT

Figure 1:
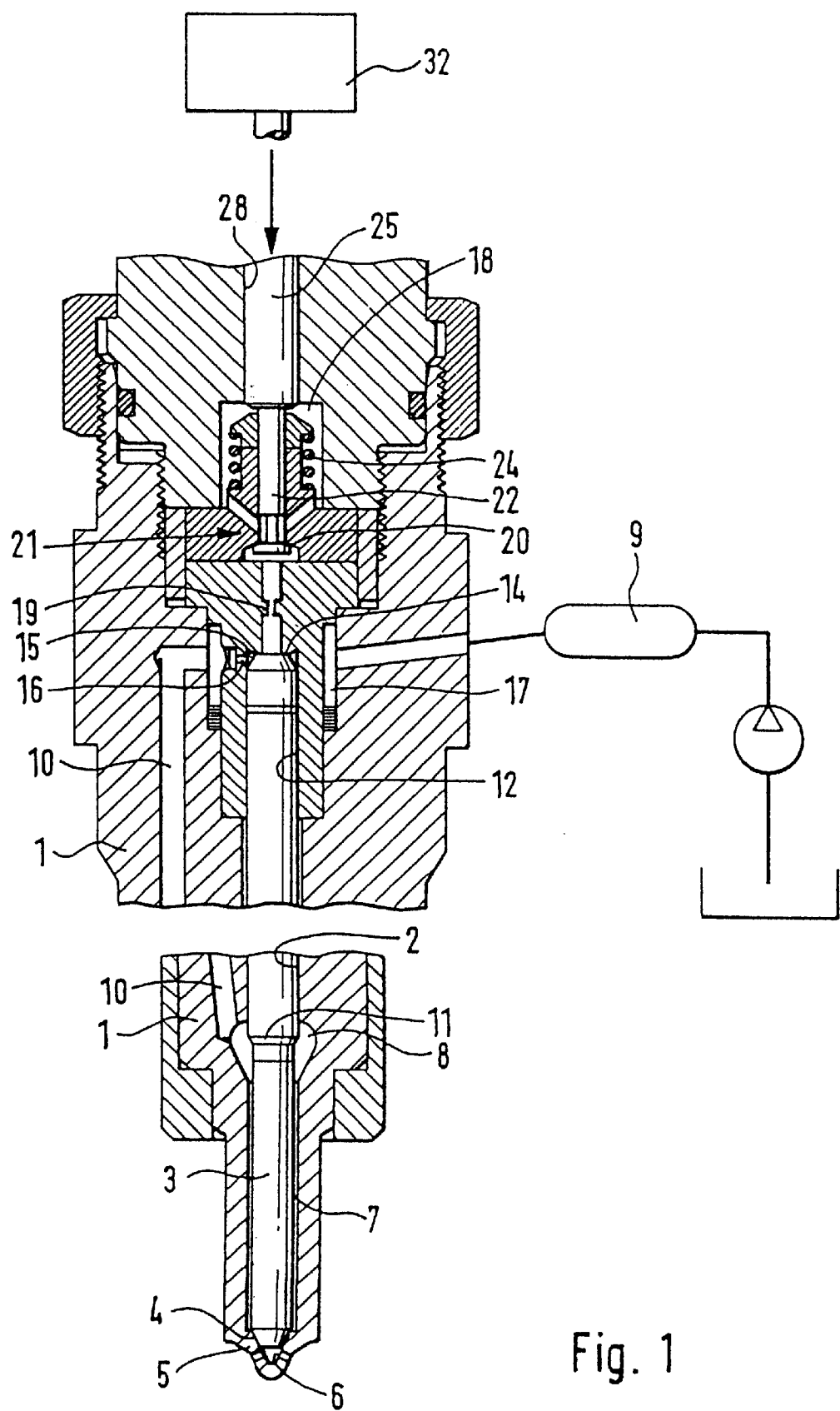
FIG. 1, a fuel injection valve in section.
Figure 2:
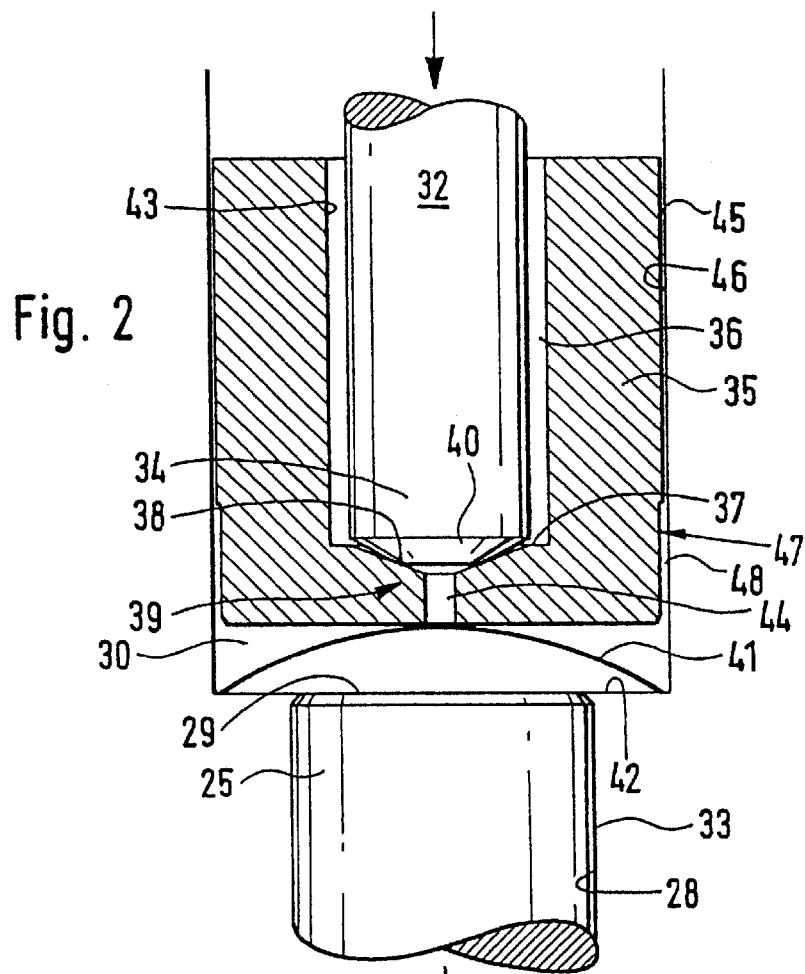
FIG. 2, a piston arrangement at a coupling chamber.

The valve of the invention is used in a fuel injection valve, which is shown in its essential parts in section in FIG. 1. This injection valve has a valve housing 1, in which a valve needle 3 is guided in a longitudinal bore 2. This valve needle may also be prestressed by a closing spring in the closing direction in a known manner, not shown in further detail here. On one end, the valve needle is provided with a conical sealing face 4, which cooperates at the tip 5 of the valve housing protruding into the combustion chamber with a seat 6, from which injection openings lead away. In the interior of the injection valve, in this case, the annular chamber 7 surrounding the valve needle 3 and filled with fuel at injection pressure communicate with the combustion chamber, so as to execute an injection when the valve needle has lifted from its seat. The annular chamber communicates with a further pressure chamber 8, which is in constant communication with a pressure line 10 by way of which the fuel injection valve is supplied with fuel at injection pressure from a high-pressure fuel reservoir 9. This high fuel pressure is also operative in the pressure chamber 8 and there acts on a pressure shoulder 11, by way of which in a known manner the nozzle needle can be lifted from its valve seat, under suitable circumstances.

On the other end of the valve needle, the valve needle extends into a cylinder bore 12, where with its end face 14 it encloses a control pressure chamber 15, which communicates constantly via a throttle connection 16 with an annular chamber 17, which like the pressure chamber 18 is always in communication with the high-pressure fuel reservoir. A throttle bore 19 leads axially away from the control pressure chamber 15 to a valve seat 20 of a control valve 21. Cooperating with the valve seat is a valve member 22 of the control valve, which in the state where the valve is lifted from the valve seat establishes a communication between the control pressure chamber 15 and a spring chamber 18, which in turn communicates constantly with a relief chamber. A compression spring 24 that urges the valve member 22 in the control valve is disposed in the spring chamber 18 and urges the valve member 22 onto the valve seat 20, so that in the normal position of the control valve, this communication with the control pressure chamber 15 is closed. Since the area of the face end of the valve needle 3 in the region of the control pressure chamber is larger than the area of the pressure shoulder 11, the same fuel pressure in the control pressure chamber, which also prevails in the pressure chamber 8, now keeps the valve needle 3 in the closed position. Once the valve member 22 has lifted away, however, the pressure in the control pressure chamber 15, decoupled via the throttle connection 16, is relieved. With the closing force now absent or reduced, the valve needle 3 opens quickly, optionally counter to the force of a closing spring, and on the other hand can be brought into the closing position as soon as the valve member 22 returns to its closing position, since from that moment on, via the throttle connection 16, the original high fuel pressure in the control pressure chamber 15 is rapidly restored.

The control valve of the invention has a piston 25, which is intended to actuate the control valve and acts on the valve member 22 and is in turn actuatable by a piezoelectric actuator 22. The piston 25 is guided in a guide bore 28, at the cost of a guide gap 33, and with its end face 29 defines a coupling chamber 30, which is closed off on its opposite wall by a step-up piston 35 of larger diameter; this step-up piston 35 is actuated by a piezoelectric actuator 32 and is kept in contact with the piezoelectric actuator 32 by a spring washer 41 disposed in the coupling chamber 30. The step-up piston 35 is guided in a housing bore 46 and has a guide gap 45 relative to this bore.

The coupling chamber 30, because of the different areas of the two pistons 25 and 35, serves as a step-up chamber, by stepping up a structurally dictated short stroke of the piezoelectric actuator 32 to a longer stroke of the piston 25 that actuates the control valve 21. Upon excitation of the piezoelectric actuator 32, the piston 25 is adjusted in such a way that the valve member 22 is lifted from its seat 20. The result of this is a relief of the control pressure chamber, which in turn causes the valve needle 3 to open.

The piezoelectric actuator 32 has an end 34, oriented toward the valve member 22, which dips into an axial bore 43 of the step-up piston 35. The axial bore 43 leaves an annular cylinder 36 open between itself and the piezoelectric actuator 32, and this annular cylinder acts as a filling inlet. The axial bore 43 changes over, toward the side of the coupling chamber 30 via a preferably conical annular shoulder 37, into an axial filling bore 44, which connects the annular chamber to the coupling chamber. The annular shoulder 37 is embodied as a valve seat 38 for the piezoelectric actuator 32, which together with the valve seat forms a filling valve 39. A lower end 34 of the piezoelectric actuator 32 for that purpose has a conical sealing face 40, which comes into contact with the valve seat and thus interrupts the communication between the coupling chamber 30 and the annular cylinder 36.

The leaf spring 41 in the coupling chamber 30 is braced against a housing shoulder 42 and seeks to press the step-up piston 35 with its valve seat 38 against the sealing face 40 and thus to keep the filling valve 39 closed.

A region 47, oriented toward the coupling chamber 30, of the step-up piston 35 is reduced to a smaller diameter and has a relatively large play 48 relative to the housing bore 46. The risk that the step-up piston 35 will seize in its guide from spreading of the lower, less-rigid region, is thus prevented.

The reciprocation capability of the piezoelectric actuator 32 is very slight and is stepped up with the aid of the hydraulic stepup via the hydraulic coupling chamber 30 as a longer stroke to the piston 25. At the same time, the thermal expansion of the device is absorbed by this hydraulic stepup. Upon compression of the device, a high pressure is generated in the coupling chamber 30, and this pressure causes leakage to occur via the guide gaps 33 and 45; this leakage must be compensated for again by filling the coupling chamber 30, so that the coupling chamber will not be pumped dry over the course of a plurality of strokes.

Figure 3:
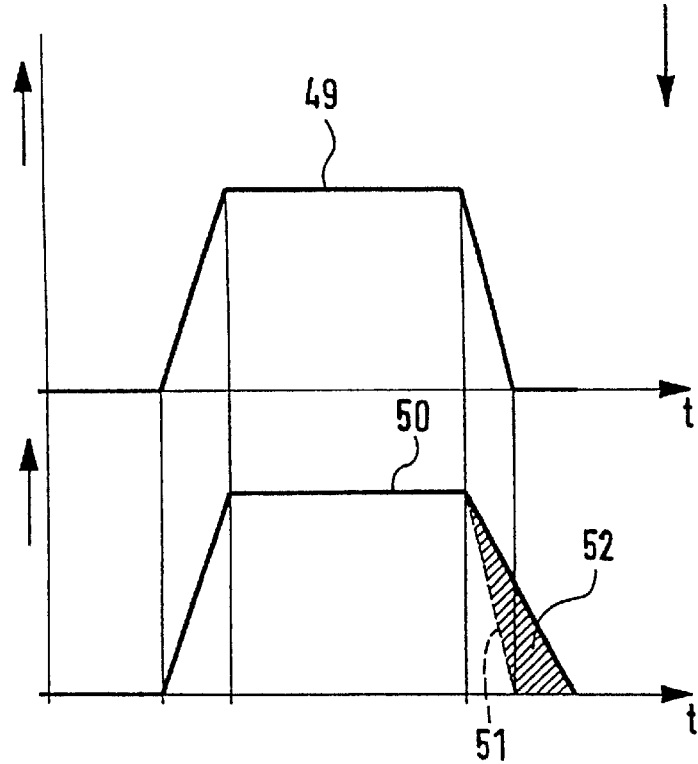
FIG. 3, a pressure graph.

FIG. 3, with the aid of a graph, shows how the strokes of the piezoelectric actuator 32 and of the step-up piston 35 have different courses over time. Because of its mass and its positive displacement of liquid, the step-up piston is unable to follow the piezoelectric actuator, which adjusts extremely quickly, with the same speed. In the upper portion of the graph, a curve 49 is shown which plots the travel of the piezoelectric actuator 32; below it is a curve 50 that plots the travel of the step-up piston 35, which cannot follow the motion of the piezoelectric actuator simultaneously. The difference in the motion of the two pistons is plotted with the dashed line 51 in the lower curve and in the form of a triangular area 52 symbolizes the time frame for filling.

It can be seen from the graph that in the course of its back-and-forth stroke, the step-up piston 35, tripped in its return stroke by the shortening of the piezoelectric actuator 32, executes a relative motion with regard to the piezoelectric actuator 32 and in other words has a different stroke speed from that of the piezoelectric actuator. This results in lifting of the step-up piston with its valve seat 37 from the piezoelectric actuator 32 and its sealing face 40 and an opening of the filling bore 44. This then leads to refilling of the coupling chamber 30.

Upon each stroke, and specifically in the closing motion of the injection valve whenever the piezoelectric actuator is retracted quickly, the refilling takes place so fast that whenever the piezoelectric actuator is retracted quickly its closing member 40 lifts from its valve seat 38 at the step-up piston 35.

Via the now-open filling valve 39, liquid flows through the annular cylinder 36 into the coupling chamber 30. At the end of the reciprocating motion of the two pistons 31 and 35, the filling valve 39 is automatically closed again by the spring 41.

The foregoing relates to preferred exemplary embodiments of the invention, it being understood that other variants and embodiments thereof are possible within the spirit and scope of the invention, the latter being defined by the appended claims.

What is claimed is:

1. A valve for controlling liquids, comprising a control valve member (22), which is actuatable counter to a force of a compression spring (24) in the opening direction by a control valve piston (25), said control valve piston having a face end which closes off a portion of a hydraulic coupling chamber (30), said hydraulic coupling chamber (30) having another portion which is defined by a face end of a step-up piston (35), said step-up piston has a larger diameter than the control valve piston (25) and is movable in a working stroke by a piezoelectric actuator (32), wherein a pressure increase in the coupling chamber is generated by the working stroke of the step-up piston, and as a result of this increase, the control value piston (25) is movable counter to a force of the compression spring (24), in which the step-up piston (35) is movable relative to the piezoelectric actuator (32) and together with the piezoelectric actuator forms a filling valve (39), by which filling valve (39) the coupling chamber (30) is made to communicate with a liquid source (36), and, in a course of a reciprocating motion of the step-up piston (35), the step-up piston executes a movement with respect to the piezoelectric actuator (32).

2. The valve according to claim 1, in which the step-up piston (35) is guided in a housing bore (46), leaving a narrow guide gap (45), and that a lower region (47) of said step-up piston, oriented toward the coupling chamber (30) of the step-up piston (35) is reduced to a smaller outside diameter, which provides play relative to the housing bore (46).

3. The valve according to claim 1, in which the step-up piston (35) has a different stroke speed from the piezoelectric actuator (32), and that the speed difference is utilized for opening the filling valve (39) and for filling liquid into the coupling chamber (30).

4. The valve according to claim 3, in which the step-up piston (35) concentrically surrounds the piezoelectric actuator (32) at one end (34) of the piezoelectric actuator oriented toward the control valve member (22) and leaves an annular cylinder (36) open as a filling inlet, said annular cylinder (36) having an inner annular shoulder (37) which provides a valve seat (38), which together with the one end (34) of the piezoelectric actuator serving as a filling valve (39) which controls a filling bore (44) that connects the annular cylinder (36) with the coupling chamber (30).

5. The valve according to claim 4, in which the step-up piston (35) is urged toward the piezoelectric actuator by the force of a second spring (41), which is supported on a housing shoulder (42) and, during a return stroke of the piezoelectric actuator (32) causes the step-up piston to follow the piezoelectric actuator.

6. The valve according to claim 4, in which the end (40) of the piezoelectric actuator (32) is shaped so as to close said valve seat (38) of the filling valve (39).

7. The valve according to claim 6, in which the step-up piston (35) is urged toward the piezoelectric actuator by the force of a second spring (41), which is supported on a housing shoulder (42) and, during a return stroke of the piezoelectric actuator (32) causes the step-up piston to follow the piezoelectric actuator.

8. The valve according to claim 1, in which the step-up piston (35) concentrically surrounds the piezoelectric actuator (32) at one end (34) of the piezoelectric actuator oriented toward the control valve member (22) and leaves an annular cylinder (36) open as a filling inlet, said annular cylinder (36) having an inner annular shoulder (37) which provides a valve seat (38), which together with the one end (34) of the piezoelectric actuator serving as a filling valve (39) which controls a filling bore (44) that connects the annular cylinder (36) with the coupling chamber (30).

9. The valve according to claim 8, in which the step-up piston (35) is guided in a housing bore (46), leaving a narrow guide gap (45), and that a lower region (47) of said step-up piston, oriented toward the coupling chamber (30) of the step-up piston (35) is reduced to a smaller outside diameter, which provides play relative to the housing bore (46).

10. The valve according to claim 8, in which the step-up piston (35) has a large bore (43), which receives the piezoelectric actuator (32) and continues to the coupling chamber (30) through the filling bore (44), and that the inner annular shoulder (37) for said valve seat is located at the transition from the large bore (43) to the smaller filling bore (44).

11. The valve according to claim 10, in which the step-up piston (35) is guided in a housing bore (46), leaving a narrow guide gap (45), and that a lower region (47) of said step-up piston, oriented toward the coupling chamber (30) of the step-up piston (35) is reduced to a smaller outside diameter, which provides play relative to the housing bore (46).

12. The valve according to claim 8, in which the step-up piston (35) is urged toward the piezoelectric actuator by the force of a second spring (41), which is supported on a housing shoulder (42) and, during a return stroke of the piezoelectric actuator (32) causes the step-up piston to follow the piezoelectric actuator.

13. The valve according to claim 12, in which them step-up piston (35) has a large bore (43), which receives the piezoelectric actuator (32) and continues to the coupling chamber (30) through the filling bore (44), and that the inner annular shoulder (37) for said valve seat is located at the transition from the large bore (43) to the smaller filling bore (44).

14. The valve according to claim 12, in which the step-up piston (35) is guided in a housing bore (46), leaving a narrow guide gap (45), and that a lower region (47) of said step-up piston, oriented toward the coupling chamber (30) of the step-up piston (35) is reduced to a smaller outside diameter, which provides play relative to the housing bore (46).

15. The valve according to claim 8, in which the end (40) of the piezoelectric actuator (32) is shaped so as to close said valve seat (38) of the filling valve (39).

16. The valve according to claim 15, in which the step-up piston (35) is urged toward the piezoelectric actuator by the force of a second spring (41), which is supported on a housing shoulder (42) and, during a return stroke of the piezoelectric actuator (32) causes the step-up piston to follow the piezoelectric actuator.

17. The valve according to claim 15, in which the step-up piston (35) has a large bore (43), which receives the piezoelectric actuator (32) and continues to the coupling chamber (30) through the filling bore (44), and that the inner annular shoulder (37) for said valve seat is located at the transition from the large bore (43) to the smaller filling bore (44).

18. The valve according to claim 15, in which the step-up piston (35) is guided in a housing bore (46), leaving a narrow guide gap (45), and that a lower region (47) of said step-up piston, oriented toward the coupling chamber (30) of the step-up piston (35) is reduced to a smaller outside diameter, which provides play relative to the housing bore (46).

19. A control valve for controlling liquids, comprising a control valve member (22) which is acted upon by a resilient force of a return spring (24), by means of which the control valve member is brought to a starting position, the control valve member is provided with an actuation piston (25), one side of the actuation piston delimits part of a wall of a closed coupling chamber (30) filled with a liquid, which closed coupling chamber, at another part, is further delimited by a side of a step-up piston (35), which side of the step-up piston has a larger end face than the one side of the actuation piston, and which step-up piston is actuated by a piezoelectric actuator (32), thereby initiating the movement of the actuating piston via the liquid received in the closed coupling chamber against the force of the return spring, and moved back by the return spring upon a respective backward movement of the actuator (32), the step-up piston having at its side remote from the closed coupling chamber an inner cylinder (43) which is in permanent connection to a source of liquid and which is connectable to the closed coupling chamber by means of a bore (44) in the side of the step-up piston, and in which the piezoelectric actuator projects into the inner cylinder (43), coming into abutment at the inner side of the inner cylinder of the step-up piston and covering said bore (44) thus closing the connection between the liquid source and the closed coupling chamber, whereas on a quick movement of the piezoelectric actuator backward off the inner side of the step-up piston, the step-up piston is held back a short time because of its displacement resistance thereby opening the connection between the liquid source and the coupling chamber via said bore so as to replace liquid losses from the closed chamber occurring on the movement of said actuating piston (25) and said step-up piston.

* * * * *